(12) United States Patent
Hegg

(10) Patent No.: US 9,122,039 B2
(45) Date of Patent: Sep. 1, 2015

(54) COMPACT INTERNAL FIELD OF VIEW SWITCH AND PUPIL RELAY

(71) Applicant: Raytheon Company, Waltham, MA (US)

(72) Inventor: Ronald G. Hegg, Vista, CA (US)

(73) Assignee: RAYTHEON COMPANY, Waltham, MA (US)

( * ) Notice: Subject to any disclaimer, the term of this patent is extended or adjusted under 35 U.S.C. 154(b) by 202 days.

(21) Appl. No.: 13/787,013

(22) Filed: Mar. 6, 2013

(65) Prior Publication Data

US 2014/0253999 A1    Sep. 11, 2014

(51) Int. Cl.
| | |
|---|---|
| *G02B 15/00* | (2006.01) |
| *G02B 13/14* | (2006.01) |
| *G02B 15/02* | (2006.01) |
| *H04N 5/225* | (2006.01) |
| *H04N 5/33* | (2006.01) |
| *G02B 19/00* | (2006.01) |
| *G02B 17/06* | (2006.01) |

(52) U.S. Cl.
CPC ............. *G02B 15/00* (2013.01); *G02B 13/14* (2013.01); *G02B 15/02* (2013.01); *G02B 17/0657* (2013.01); *G02B 17/0694* (2013.01); *G02B 19/0085* (2013.01); *H04N 5/2259* (2013.01); *H04N 5/33* (2013.01); *G02B 17/0647* (2013.01)

(58) Field of Classification Search
CPC ............ G02B 17/06–17/0694; G02B 27/0927; G02B 15/02; G02B 15/00; G02B 13/14; H04N 5/22; H04N 5/2259
USPC ......... 359/362–366, 399, 400, 423, 434, 350, 359/351, 354, 359, 838, 857–861
See application file for complete search history.

(56) References Cited

U.S. PATENT DOCUMENTS

| | | | |
|---|---|---|---|
| 5,078,502 A | 1/1992 | Cook | |
| 6,084,727 A * | 7/2000 | Cook | ........................... 359/850 |
| 6,178,047 B1 | 1/2001 | Cook | |
| 2002/0034000 A1 | 3/2002 | Hoult et al. | |
| 2005/0029458 A1 | 2/2005 | Geng et al. | |
| 2006/0146399 A1 | 7/2006 | Cook | |
| 2010/0321808 A1* | 12/2010 | Bentley et al. | ................ 359/859 |

OTHER PUBLICATIONS

Rogers, Philip J., "Compact Multispectral Optic with Switchable Fields of View," Proc. of SPIE, vol. 3737, Aug. 27, 1999, pp. 261-268.

* cited by examiner

*Primary Examiner* — Scott J Sugarman
*Assistant Examiner* — Wen Huang
(74) *Attorney, Agent, or Firm* — Lando & Anastasi, LLP

(57) ABSTRACT

An optical system incorporating a compact internal field of view switch configured to switch the field of view of the optical system between a narrow field of view and a wide field of view while maintaining a constant exit aperture size. In one example the optical system includes an active imaging sub-system optically coupled to the exit aperture, and the field of view switch is positioned between the exit aperture and the active imaging sub-system. In one example the field of view switch is configured as a pupil relay having non-unity magnification.

18 Claims, 6 Drawing Sheets

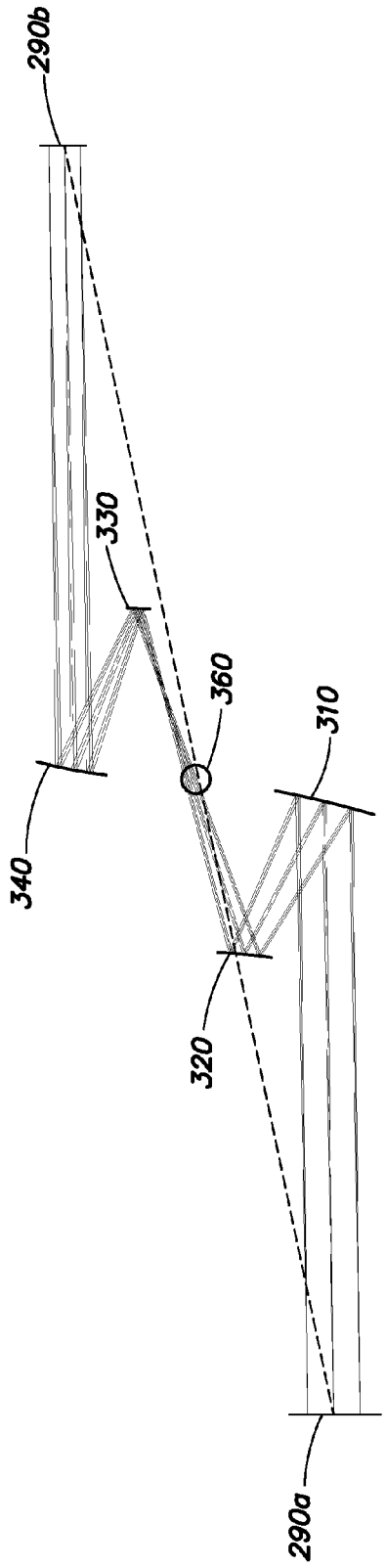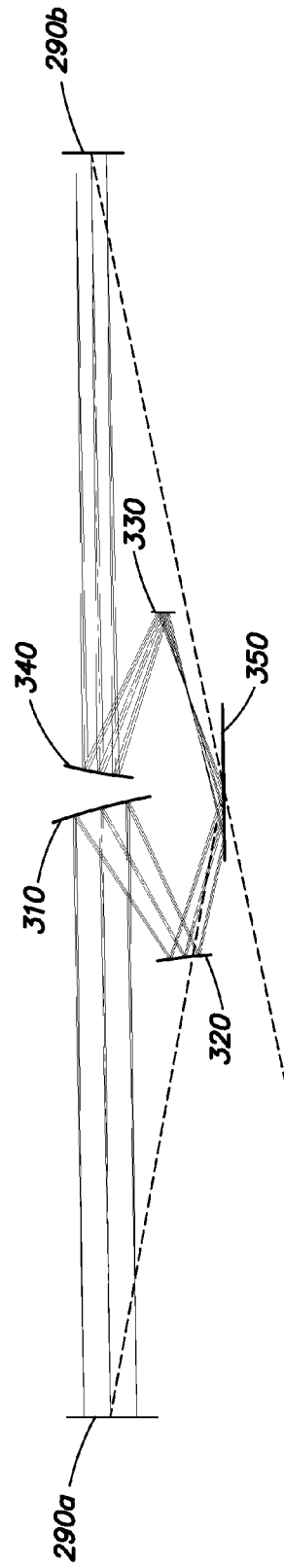

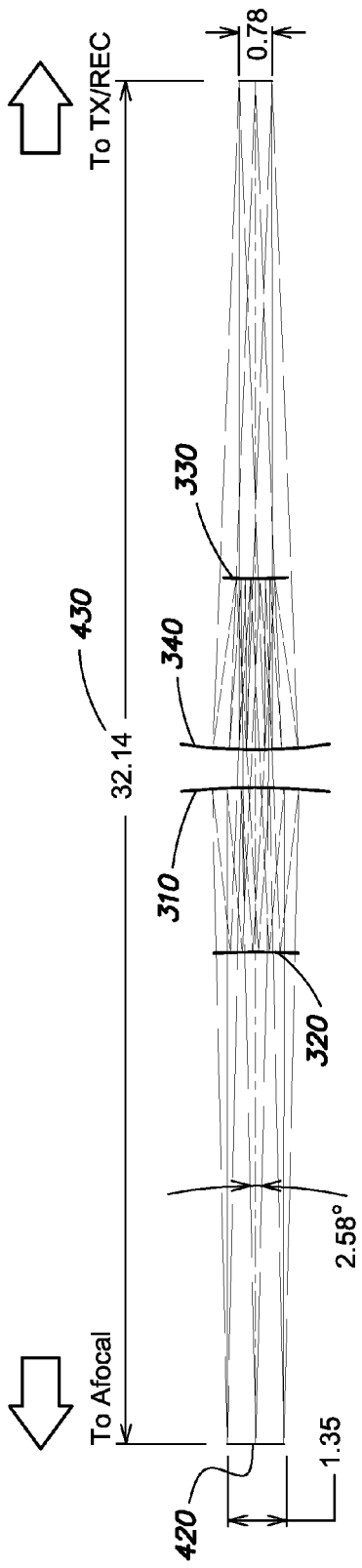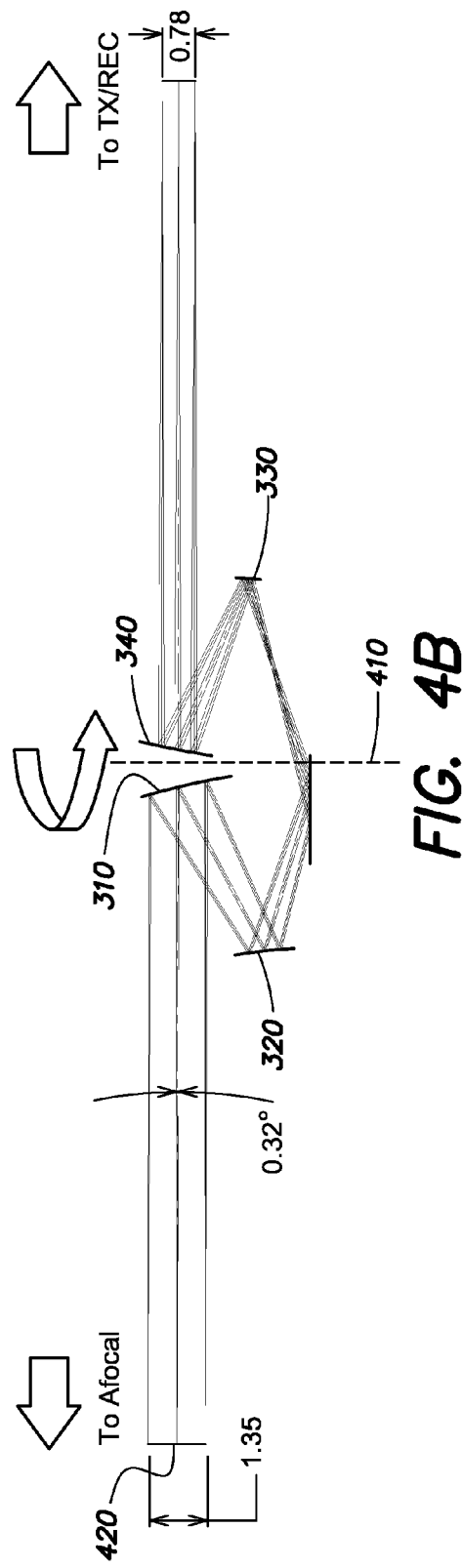

COMPACT INTERNAL FIELD OF VIEW SWITCH AND PUPIL RELAY

FEDERALLY SPONSORED RESEARCH

This invention was made with government support under Grant No. FA8721-05-C-0002 awarded by the U.S. Department of Defense. The U.S. government has certain rights in this invention.

BACKGROUND

There are numerous circumstances in which it is desirable to change the field of view of an optical system. For example, numerous applications may benefit from the ability to switch between a narrow field of view and a wide field of view. Referring to FIG. 1, there is illustrated a block diagram of a passive optical imaging system incorporating field of view switching. The system includes an afocal telescope 110 that directs electromagnetic radiation via a pupil 120 to an imager 130. The imager 130 includes various optical components that direct the electromagnetic radiation to a camera system 140, where the electromagnetic radiation is focused onto an imaging detector 142 (such as a focal plane array, for example).

For passive imaging systems, field of view switching is typically provided within the afocal telescope 110 (represented by FOV switch 115). However, in some systems field of view switching may be provided within the imager 130 (represented by FOV switch 135). In passive infrared imaging systems, the imaging detector 142 is typically kept very cold, for example, by placing it within a cryogenic chamber. As a result, the f/# of the optical system is fixed due to the presence of a fixed cold stop 144. Accordingly, changing the field of view of optical system with a field of view switch located in either the afocal telescope 110 (FOV switch 115) or the imager 130 (FOV switch 135) necessarily results in changing the aperture of the afocal telescope, since the f/# is fixed. This is illustrated in FIG. 1, with solid rays 150a, 150b representing the narrow field of view and larger aperture, and dotted rays 155a, 155b representing the wide field of view and smaller aperture. Reduced sensitivity in the wide field of view configuration, due to the smaller aperture, is generally deemed acceptable for passive imaging. If high sensitivity in a wide field of view configuration is desired, the optical system is generally designed for a fixed wide field of view focal length only.

SUMMARY OF INVENTION

Aspects and embodiments are directed to a compact internal field of view switch and pupil relay that allows the field of view of an optical system to be switched between a narrow field of view and a wide field of view while maintaining a constant aperture size.

According to one embodiment an optical system comprises an exit aperture, an active imaging sub-system optically coupled to the exit aperture and configured to transmit a beam via the output aperture and to receive a reflection of the beam via the exit aperture, and a field of view switching mechanism positioned between the exit aperture and the active imaging sub-system, the field of view switching mechanism configured as a pupil relay having non-unity magnification to switch a field of view of the active imaging sub-system between a wide field of view and a narrow field of view while maintaining a constant size of the exit aperture.

In one example of the optical system the active imaging sub-system is a LADAR (laser detection and ranging) sub-system, the beam is a laser beam, and the active imaging sub-system includes a laser source configured to emit the laser beam. In one example the field of view switching mechanism is an all-reflective, five mirror pupil relay. In another example the field of view switching mechanism includes a pair of Cassegrain telescopes disposed on either side of a flat fold mirror, and is configured to relay the laser beam between first and second pupils located opposite one another on either side of the field of view switching mechanism. In another example the flat fold mirror and the pair of Cassegrain telescopes are movable about an axis equidistant between the first and second pupils to switch the field of view switching mechanism between a wide field of view configuration and a narrow field of view configuration. In another example the field of view switching mechanism is all-reflective, and each Cassegrain telescope includes a pair of powered mirrors. The optical system may further comprise a passive imaging sub-system optically coupled to the exit aperture and configured to receive electromagnetic radiation via the exit aperture. In one example the passive imaging sub-system is an infrared imaging system, and the electromagnetic radiation is infrared radiation. In one example the field of view switching mechanism has a 3× magnification between the narrow field of view and the wide field of view. The optical system may further comprise an afocal telescope optically coupled to the active imaging sub-system and to the field of view switching mechanism, the afocal telescope configured to provide the exit aperture.

Another embodiment is directed to a method of field of view switching in an optical system. The method may comprise providing a field of view switching mechanism positioned on an imager side of an exit aperture of the optical system, the field of view switching mechanism including a five mirror pupil relay configured with two pairs of powered mirrors arranged on either side of a flat fold mirror, and selecting between a narrow field of view and a wide field of view by rotating the pairs of powered mirrors and the flat fold mirror about a central axis of the field of view switching mechanism that passes through the flat fold mirror.

In one example selecting between the narrow field of view and the wide field of view is achieved without changing a size of the exit aperture. The method may further comprise providing an afocal telescope configured to form the exit aperture.

According to another embodiment an optical imaging system having a variable field of view comprises an active imaging sub-system optically coupled to an exit aperture of the optical imaging system and configured to transmit a beam via the output aperture and to receive a reflection of the beam via the exit aperture, a passive imaging sub-system optically coupled to the exit aperture and configured to receive electromagnetic radiation via the exit aperture, and means for switching the field of view of the active imaging sub-system between a wide field of view and a narrow field of view while maintaining a constant size of the exit aperture, the means for switching being positioned between the exit aperture and the active imaging sub-system.

In one example the means for switching includes a pupil relay having non-unity magnification. In another example the pupil relay includes a pair of Cassegrain telescopes disposed on either side of a flat fold mirror, and is configured to relay the laser beam between first and second pupils located opposite one another on either side of the field of view switching mechanism. In another example the flat fold mirror and the pair of Cassegrain telescopes are movable about an axis equidistant between the first and second pupils. The optical imaging system may further comprise an afocal telescope optically coupled to the active imaging sub-system and to the passive imaging sub-system, and configured to provide the exit aperture. In one example the active imaging sub-system is a LADAR sub-system, the beam is a laser beam, and the active imaging sub-system includes a laser source configured to emit the laser beam. In another example the passive imaging sub-system is an infrared imaging system, and the electromagnetic radiation is infrared radiation.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 3A is a ray trace of one example of an all-reflective field of view switch according to aspects of the invention;

FIG. 3B is a ray trace of the field of view switch of FIG. 3A including a fold mirror positioned at an optical center of the switch according to aspects of the invention;

FIG. 4A is a top view of one example of a five mirror, 3× magnification, field of view switch and pupil relay, shown in the narrow field of view configuration, according to aspects of the invention;

FIG. 4B is a side view of the configuration of FIG. 4A;

DETAILED DESCRIPTION

Active imaging systems, such as LADAR (light detection and ranging), use a laser beam to illuminate a scene and collect returned electromagnetic radiation scattered or reflected from objects in the scene to create an image of the scene. Maximizing active imaging range requires a large aperture to collect the return signal, typically leading to a large primary mirror aperture for narrow field of view configurations.

Figure 1:
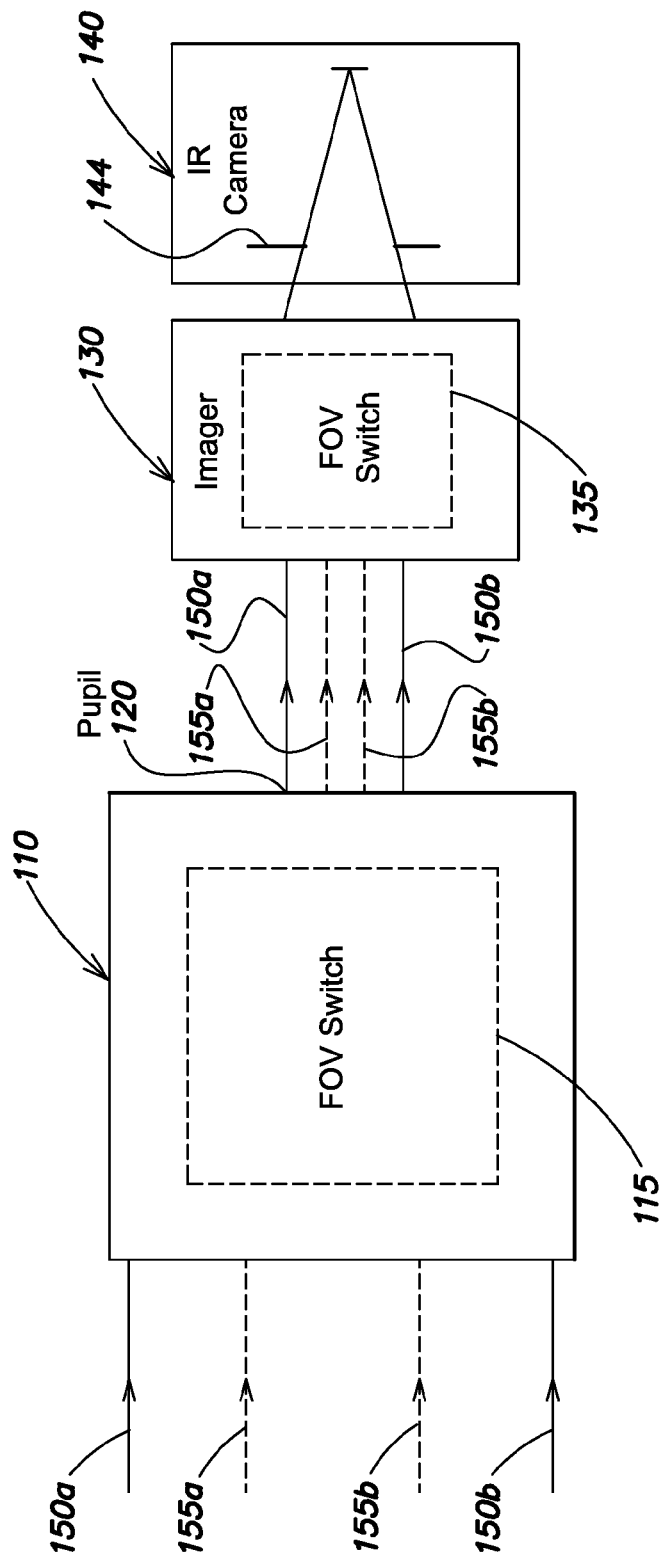
FIG. 1 is a block diagram of a conventional optical imaging system including a field of view switching mechanism.

For certain applications, it is desirable to combine an active imaging sub-system (e.g., a LADAR system) with a passive imaging sub-system using at least some shared optical components, such as a shared afocal telescope. For passive imaging systems, a wide field of view configuration may be desirable. However, as discussed above, for many passive imaging systems, particularly, infrared imaging systems, the f/# of the system is fixed, and therefore providing a wide field of view configuration necessarily results in a smaller aperture. For example, the afocal telescope (or a portion thereof) may be bypassed to provide additional field of view at the expense of aperture size. However, smaller aperture size reduces collection efficiency at the maximum range of the active imaging sub-system. Accordingly, conventional field of view switching mechanisms provided in the afocal telescope or in the imager (as discussed above with reference to FIG. 1) are not preferred since such mechanisms either alter the f/#, which cannot be done for passive imaging sub-systems having a fixed stop, or the aperture size, which detrimentally affects the active imaging sub-system.

Aspects and embodiments are directed to a compact internal optical field of view switching mechanism that allows switching between a narrow field of view configuration and wide field of view configuration while maintaining the full aperture of the primary mirror and afocal telescope and maximizing sensitivity in both fields of view. As discussed further below, the field of view switching mechanism is implemented on the imager side of the afocal telescope to provide constant full-aperture efficiency, and incorporates a pupil relay that sets equivalent eye relief on both sides of the switch mechanism to allow for compact switching. According to one embodiment, the optical system, including the field of view switch, is fully reflective, which may be preferable for multi-wavelength operation (e.g., LADAR and infrared imaging). As discussed in more detail below, in one embodiment, a five-mirror internal pupil relay with non-unity magnification is used to provide dual field of view capability without sacrificing received energy. In addition, the pupil relay may be configured to maintain path stability between transmit and receive functions without added backscatter.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 2:
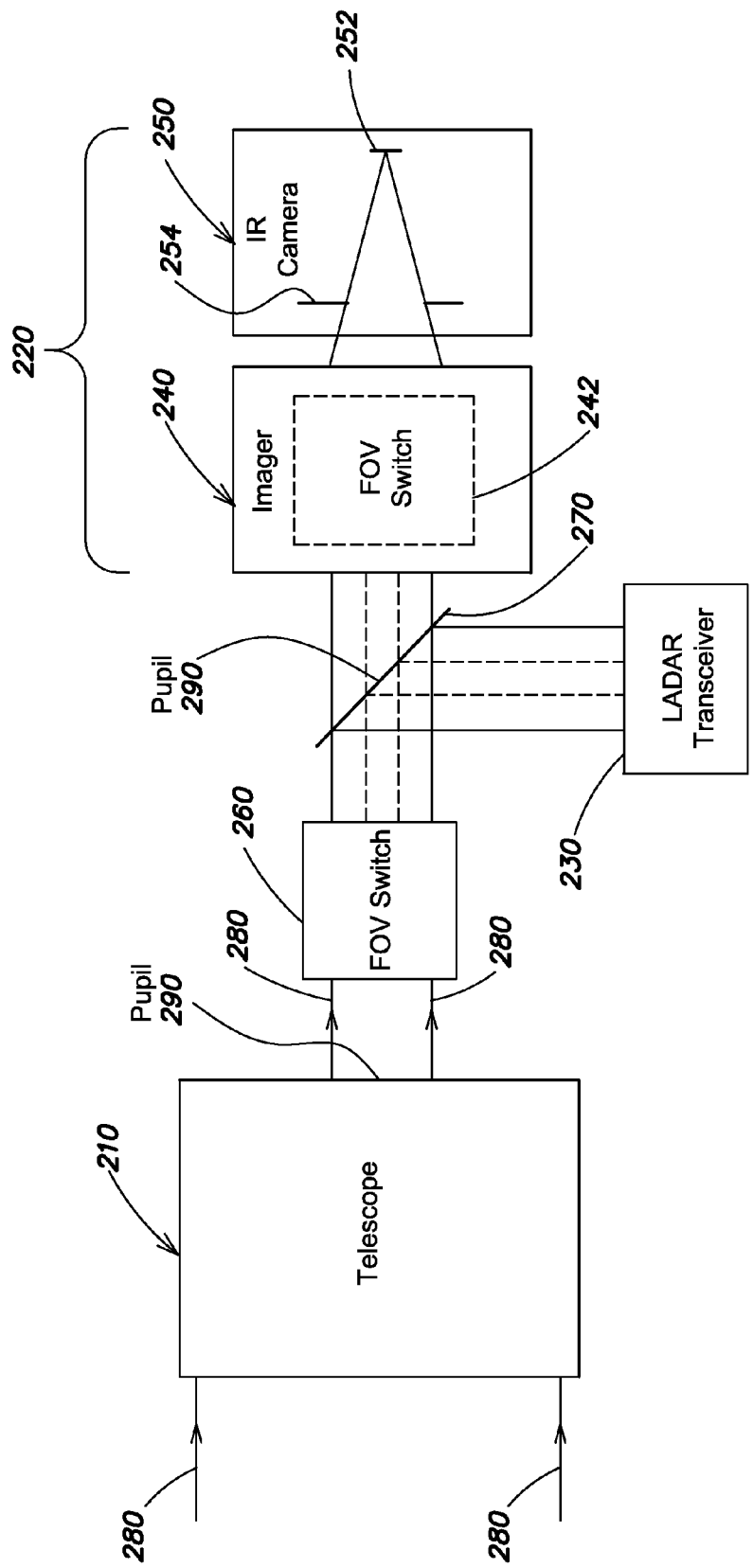
FIG. 2 is a block diagram of one example of an optical system including a field of view switch and pupil relay according to aspects of the invention.
Figure 4C:
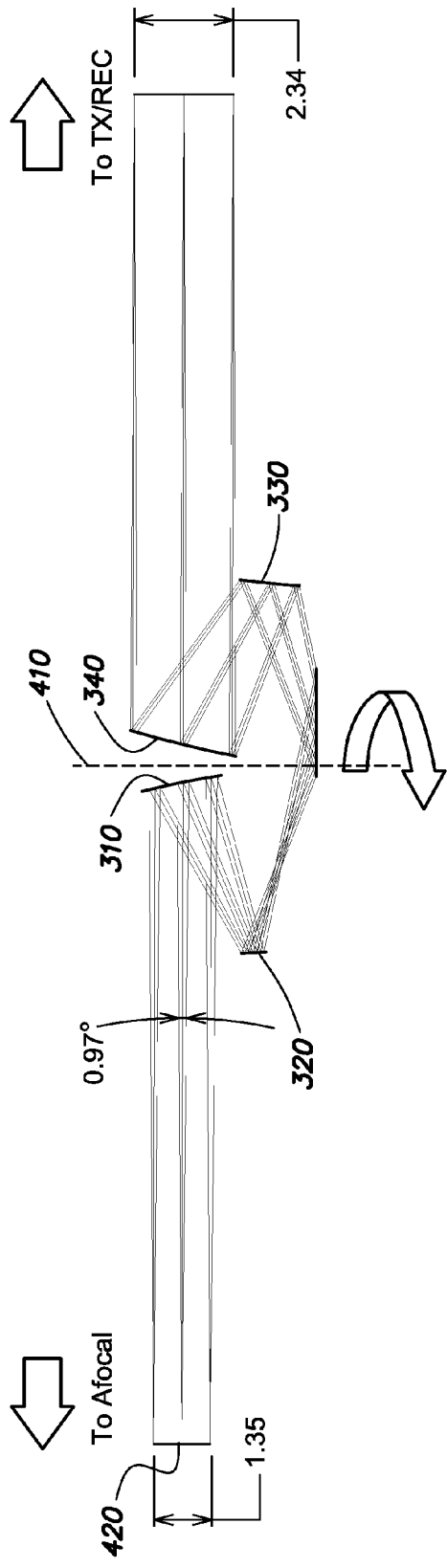
FIG. 4C is a top view of the five mirror, 3× magnification, field of view switch and pupil relay of FIG. 4A, shown in the narrow field of view configuration.
Figure 4D:
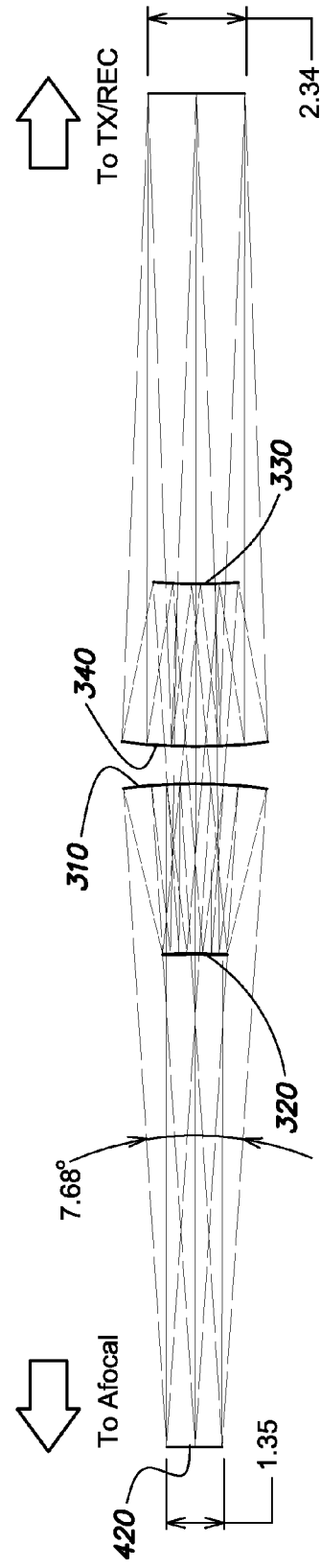
FIG. 4D is a side view of the configuration of FIG. 4C.

Referring to FIG. 2, there is illustrated a block diagram of one example of a multi-function optical system configured for a dual field of view arrangement according to one embodiment. The optical system includes an afocal telescope 210, a "context" imaging sub-system 220, and an active imaging sub-system 230. In one example, the active imaging sub-system 230 is a LADAR system and includes a LADAR transceiver. The context imaging sub-system 220 includes an imager 240 optically coupled to a camera 250. In one embodiment the context imaging sub-system 220 is a passive imaging system, for example, a passive infrared imaging system. In this example, the camera 250 is an infrared camera including an imaging detector 252 (such as a focal plane array or microbolometer array), which is optionally cooled within a cold chamber, such as a cold Dewar, having a cold stop 254. The imager 240 may optionally include an additional field of view switching mechanism 242. This additional field of view switching mechanism 242 may provide field of view switching for the context imaging sub-system 220 alone, without affecting the field of view of the active imaging sub-system 230.

A pupil-forming field of view switch 260 is positioned between the afocal telescope 210 and the two imaging sub-systems 220, 230. A beamsplitter 270 directs electromagnetic radiation from the field of view switch 260 to either the active imaging sub-system 230 or the context imaging sub-system 220 and from the active imaging sub-system 230 to the field of view switch 260. The field of view switch 260 is configured to switch the field of view of the optical system between a wide field of view (represented by the dotted lines) and a narrow field of view (represented by the solid lines). However, as may be seen with reference to FIG. 2, the collection aperture (represented by solid arrowed lines 280) does not change for the active imaging sub-system image, even for the wider field of view configuration. In addition, the field of view switch 260 presents two pupils 290 equidistant from a center of the optics making up the field of view switch. Thus, the field of view switch 260 acts as a pupil relay with non-unity magnification (to provide the changing field of view) but balanced eye relief, such that the images remain in the same position for both fields of view, as discussed further below. This arrangement maintains a large collection aperture for both fields of view, as is desirable for the active imaging sub-system 230, and is compatible with a context imaging sub-system 220 having a fixed f/#, such as an infrared imaging sub-system as discussed above.

According to one embodiment, an all-reflective field of view switch 260 is implemented using five mirrors. In one example, the field of view switch 260 is configured for 3× magnification; however, as will be appreciated by those skilled in the art, given the benefit of this disclosure, the optical prescription may be adjusted to provide a switch with a different magnification. Referring to FIGS. 3A and 3B there is illustrated one example of a 3× all-reflective field of view switch 260 according to one embodiment. The field of view switch 260 includes four powered mirrors, namely, a first mirror 310, a second mirror 320, a third mirror 330, and a fourth mirror 340.

As discussed above, since the field of view switch 260 is positioned after the afocal telescope 210 (as shown in FIG. 2), it is preferable that the switch acts as a pupil relay so that the outgoing laser transmitter path in the wide field of view configuration may be kept within the apertures of the optical elements. Accordingly, the mirrors 310, 320, 330 and 340 are configured as back-to-back off-axis Cassegrain telescopes to provide the relay function, relaying images from the pupil 290a on the transmitter/receiver side to the pupil 290b on the afocal side, and vice versa. The field of view switch 260 may be inserted into an optical system (such as that shown schematically in FIG. 2, for example) with the pupil 290a on the transmitter/receiver side (proximate the active and passive imaging sub-systems) and the pupil 290b on the afocal side (proximate the afocal telescope 210). The focal lengths of the two Cassegrain telescopes, one formed by mirrors 310 and 320, and the other formed by mirrors 330 and 340, are set to provide the net magnification difference between the narrow field of view and wide field of view configurations. As shown in FIG. 3B, a flat fold mirror 350 is placed at the center 360 of the system, equidistant from the two pupils 290a, 290b. The fold mirror 350 causes the "folding up" of the two Cassegrains, placing the pupils 290a, 290b directly across from one another at opposite ends of the system, as illustrated. The eye reliefs on either side of the Cassegrains are balanced (operating with the magnification squared effect) placing the optical elements clustered towards the center between the two pupils. In addition, the pupil relay is configured to keep the internal image off of any of the mirror surfaces so as to reduce the effect of backscatter.

Table 1 provides an optical prescription for one example of the five mirror, 3× magnification field of view switch configuration shown in FIGS. 3A and 3B. The optical prescription for this example may be generated using an equation which is an industry standard and which would be known to those skilled in the art. It is to be appreciated however, that the prescription given in Table 1 is merely exemplary, and that the prescriptions of various embodiments of the field of view switch 260 are determined by the intended tasks to be performed by, and characteristics of, the optical system in which it is to be used.

In Table 1 the column designated Rd is the radius of the surfaces in units of linear dimension, e.g., centimeters. The minus sign indicates that the center of curvature is to the left of the surface. The column designated "THK" is the thickness of the surface. CC is the conic constant which is equal to the negative squared value of the eccentricity of a conic section (a planar cut through a double sheeted conic surface). The columns designated AD, AE, AF and AG are the aspheric constants of the lens surfaces. The columns YD and XD provide the decenter values of the surfaces in the Y and X dimensions, respectively.

TABLE 1

| Ref Obj. Y-HT | | Ref AP Y-HT | Obj. Surface | Ref Surface | IMG Surface | Evl SRF |
|---|---|---|---|---|---|---|
| −0.279253E+11 | (0.1600 DG) | 0.67500 | 0 | 1 | 14 | 14 |

| Basic Lens Data | | | |
|---|---|---|---|
| Surface | RD | THK | Medium |
| 0 | 0.00000 | 0.100000E+14 | Air |
| 1 | 0.00000 | 0.00000 | Air |
| 2* | 0.00000 | 0.00000 | Air |
| 3 | 0.00000 | 16.0000 | Air |
| 4* | −15.4951 | 0.00000 | Mirror |
| 5 | 0.00000 | −4.25000 | Air |

TABLE 1-continued

| | | | |
|---|---|---|---|
| 6* | −15.4951 | 0.00000 | Mirror |
| 7 | 0.00000 | 6.37586 | Air |
| 8 | 0.00000 | 2.26632 | Air (Intermediate Image) |
| 9* | 11.7728 | 0.00000 | Mirror |
| 10 | 0.00000 | −4.25000 | Air |
| 11* | 11.7728 | 0.00000 | Mirror |
| 12 | 0.00000 | 16.0000 | Air |
| 13* | 0.00000 | 0.00000 | Air |
| 14 | 0.00000 | | |

Tilt and Decenter Data

| Surface | Type | YD | XD | Alpha | Beta | Gamma |
|---|---|---|---|---|---|---|
| 2 | Tilt | 0.00000 | 0.00000 | 0.00000 | 0.00000 | 0.00000 |
| 4 | Decenter | 4.00000 | 0.00000 | | | |
| 13 | Decenter | 2.30933 | 0.00000 | | | |

CC and Aspheric Data

| Surface | CC | AD | AE | AF | AG |
|---|---|---|---|---|---|
| 4 | −1.719355 | −0.9762735E−05 | 0.1167083E−06 | 0.000000 | 0.000000 |
| 6 | 6.718667 | 0.8994841E−03 | −0.1027631E−04 | 0.3633570E−06 | 0.000000 |
| 9 | 0.000000 | −0.4906214E−03 | 0.4895822E−04 | 0.2440925E−04 | −0.7177881E−05 |
| 11 | −0.8497883 | 0.2870991E−04 | 0.2972706E−06 | −0.4532161E−09 | 0.000000 |

According to one embodiment, in order to operate the field of view switch to switch the system between a wide field of view (WFOV) configuration and a narrow field of view (NFOV) configuration, at least some of the optical elements of the field of view switch 260 may be movable so as to switch the magnification and field of view from one setting to the other. This is illustrated in FIGS. 4A-4D, which show the 3× magnification configuration of the field of view switch 260 discussed above with reference to FIGS. 3A and 3B. In the illustrated example, switching between the NFOV configuration (FIGS. 4A and 4B) and WFOV configuration (FIGS. 4C and 4D) is accomplished by rotating or flipping the optical elements 180° about an axis 410 that passes through the flat fold mirror 350 and the center point between the two pupils 290a, 290b. As the optical elements of the field of view switch are rotated about the axis 410, the field of view is changed, while keeping the locations of the pupil 290a, 290b fixed. The optical path is then directed through the afocal telescope 210, having the effect of changing the field of view without changing the size of the aperture size.

In the example shown in FIGS. 4A-4D, the field of view switch 260 has a length 430 of 32.14 inches. In the NFOV configuration the field of view at the pupil 290b is 0.78 inches, and in the WFOV configuration the field of view at the pupil 290b is 2.34 inches, thus corresponding to a magnification between the NFOV configuration and the WFOV configuration of 3×. Similarly, in this example, the beam diameter varies from approximately 0.32° in the NFOV configuration to 0.97° in the WFOV configuration in the dimension shown in the side views of FIGS. 4B and 4C. However, as can be seen with reference to FIGS. 4A-4D, the aperture 420 on the afocal side of the field of view switch 260 remains the same size, 1.35 inches in the illustrated example, in both the NFOV and WFOV configurations. It will be appreciated by those skilled in the art, given the benefit of this disclosure, that the size of the aperture 420 should be large enough to accommodate the beam diameters in either the NFOV or WFOV configurations since the f/# of the optical system will change with changing field of view.

Thus, according to certain aspects and embodiments, field of view switching may be accomplished using a five mirror off-axis pupil relay with non-unity magnification, but with identical eye reliefs on either side to allow for compact switching. Conventional pupil relays typically provide only unity (1:1) magnification, and therefore cannot provide any field of view switching capability. Conventional field of view switching mechanisms, as discussed above, generally do not include or need a pupil relay since the system f/# is typically fixed by a stop, such as the cold stop of an infrared imaging system. In contrast, aspects and embodiments disclosed herein provide a combine field of view switching mechanism and pupil relay which can be positioned on the imager side of the afocal telescope, thereby preserving the full aperture 420 while changing the focal length.

Figure 5:
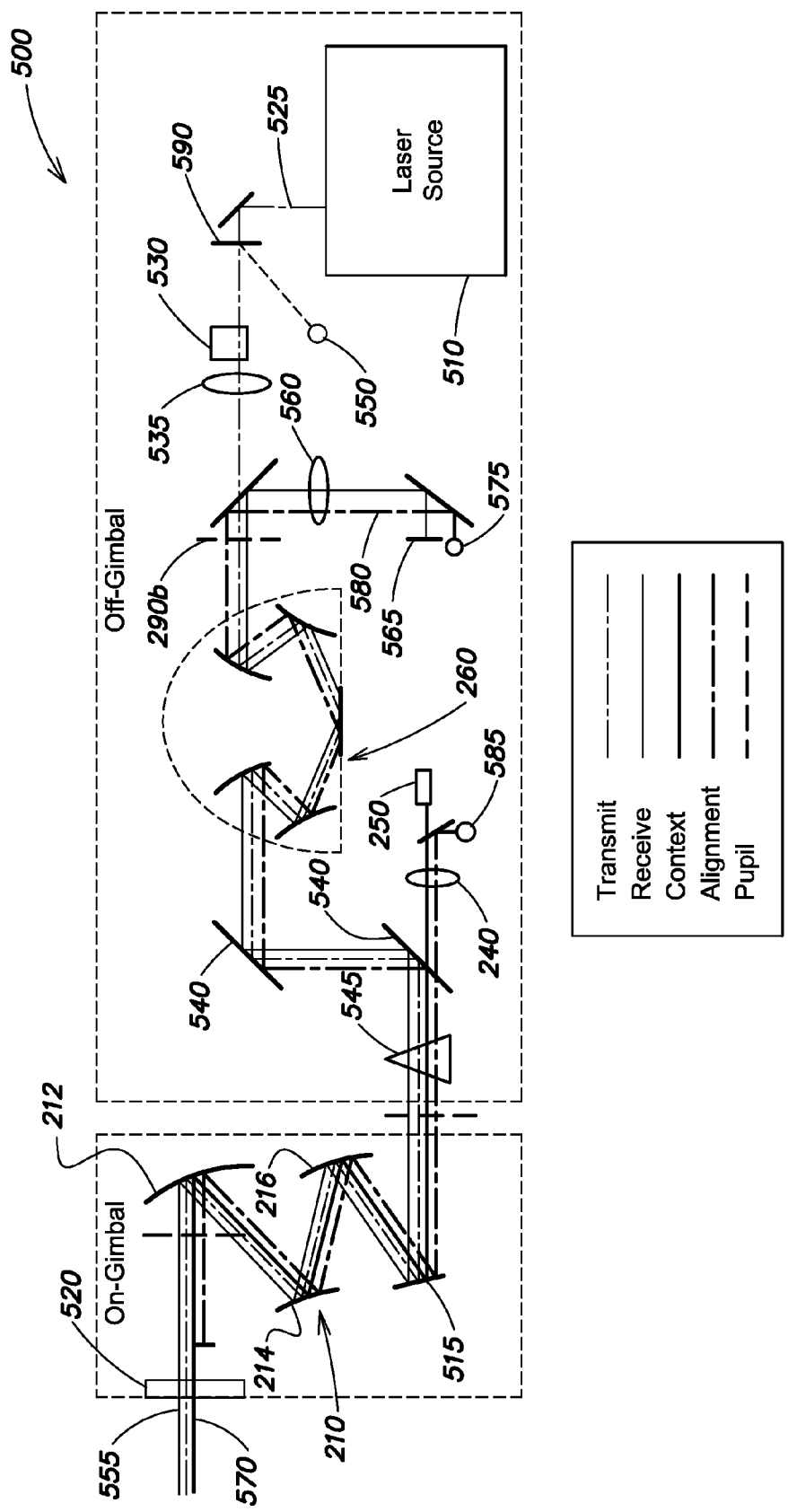
FIG. 5 is a block diagram of one example of an optical system including a field of view switching mechanism according to aspects of the invention.

Referring to FIG. 5 there is illustrated a block diagram of one example of an optical system incorporating the field of view switch 260. As will be appreciated by those skilled in the art, given the benefit of this disclosure, the implementation illustrated in FIG. 5 is intended to be exemplary only; and embodiments of the field of view switch 260 may be useful for and implemented in numerous different optical systems. In the illustrated example, the optical system 500 includes a context imaging sub-system (such as context imaging sub-system 220), including a context imager 240 coupled to a context camera 250, and a LADAR sub-system including a laser source 510. The laser source 510, and associated optics, as well as the context imaging sub-system 220 are located "off gimbal" meaning that they are mounted to a platform, such as a vehicle or aircraft, for example, and are not configured to rotate or otherwise move independently of the platform itself. The optical system 500 further includes an afocal telescope 210, and optionally an FSM 515, which are gimbal-mounted. In the illustrated example the afocal telescope 210 includes three mirrors 212, 214, 216 which may be arranged in either the reflective triplet or three mirror anastigmat forms, for example. Electromagnetic radiation is transmitted from and received by the afocal telescope 210 via a window 520.

In one embodiment, the laser source 510 emits a laser beam 525 that is directed via beam separators 530 (in those examples in which the laser source emits multiple beams) and at least one transmit focus lens 535 to the field of view switch 260. Beam-steering mirrors 540 may be used to scan the laser beam 525 within the field of view of the optical system 500. The laser beam is transmitted to object space via the afocal telescope 210 and window 520. As discussed above, in certain embodiments, the afocal telescope is gimbal-mounted, whereas the LADAR system and context imaging sub-system are body-mounted (off-gimbal). Therefore, the system may include a derotation prism 545 to compensate for rotation of the gimbal, and therefore the afocal telescope 210, relative to the body of the host platform. In one example, the optical system 500 includes a laser alignment detector 550. A holographic beam sampler 590 may be used to "split off" a very small portion of the incident laser illumination and direct the portion to the laser alignment detector 550.

As known to those skilled in the art of LADAR systems, a portion of the transmitted laser beam 525 is reflected or scattered by objects in the scene and returned via the window 520 and afocal telescope 210 as return beam 555. The return beam 555 is directed via the field of view switch 260 and a receiver imager 560 to a LADAR detector 565. The context imaging sub-system receives electromagnetic radiation 570 which is directed from the afocal telescope 210 via the context imager 240 to the context camera 250. As discussed above, in some examples the context camera 250 is an infrared imaging detector and may operate according to principles well understood by those skilled in the art of infrared imaging. The optical system may further include an auto-alignment source 575 that emits an auto-alignment beam 580 which is directed via components of the optical system 500 to an auto-alignment detector 585. The auto-alignment beam 580 may be used to measure jitter or other potential sources of mis-alignment of the optical components in the system.

Thus, aspects and embodiments provide a compact, all-reflective field of view switch 260 which can be accommodated in various embodiments of a multi-function optical system. Placing the field of view switch after the afocal telescope (i.e., on the imager side) preserves the full aperture while changing the focal length for the active imaging sub-system and without disrupting any function of the passive imaging sub-system. Thus, dual fields of view are achieved at full sensitivity. This configuration also allows the transmitter of the active sub-system (e.g., the laser source) to take advantage of the internal field of view switch without exceeding its portion of the common aperture shared with the receiver, while being fully stabilized along the common optical path. As discussed above, the field of view switch may be implemented using a five mirror internal pupil relay with non-unity magnification. The mirrors are arranged to set equivalent eye-relief distances on both sides to allow for compact switching, and to provide relatively long eye-relief to accommodate placement of beam-steering mirrors and beamsplitters, as illustrated in FIG. 5.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An optical system comprising:
    an exit aperture;
    an active imaging sub-system optically coupled to the exit aperture and configured to transmit a beam via the output aperture and to receive a reflection of the beam via the exit aperture; and
    a field of view switching mechanism positioned between the exit aperture and the active imaging sub-system, the field of view switching mechanism configured as a pupil relay having non-unity magnification to switch a field of view of the active imaging sub-system between a wide field of view and a narrow field of view while maintaining a constant size of the exit aperture, wherein the field of view switching mechanism includes a pair of Cassegrain telescopes disposed on either side of a flat fold mirror and is configured to relay the beam between first and second pupils located opposite one another on either side of the field of view switching mechanism, and wherein the flat fold mirror and the pair of Cassegrain telescopes are movable about an axis equidistant between the first and second pupils to switch between the wide field of view and the narrow field of view.

2. The optical system of claim 1, wherein the active imaging sub-system is a LADAR sub-system, the beam is a laser beam, and the active imaging sub-system includes a laser source configured to emit the laser beam.

3. The optical system of claim 2, wherein the field of view switching mechanism is an all-reflective, five mirror pupil relay including the flat fold mirror and the pair of Cassegrain telescopes.

4. The optical system of claim 1, wherein field of view switching mechanism is all-reflective, and wherein each Cassegrain telescope includes a pair of powered mirrors.

5. The optical system of claim 1, further comprising a passive imaging sub-system optically coupled to the exit aperture and configured to receive electromagnetic radiation via the exit aperture.

6. The optical system of claim 5, wherein the passive imaging sub-system is an infrared imaging system, and the electromagnetic radiation is infrared radiation.

7. The optical system of claim 1, wherein the field of view switching mechanism has a 3× magnification between the narrow field of view and the wide field of view.

8. The optical system of claim 1, further comprising an afocal telescope optically coupled to the active imaging sub-system and to the field of view switching mechanism, the afocal telescope configured to provide the exit aperture.

9. A method of field of view switching in an optical system comprising:
    providing a field of view switching mechanism positioned on an imager side of an exit aperture of the optical system, the field of view switching mechanism including a five mirror pupil relay configured with two pairs of powered mirrors arranged on either side of a flat fold mirror; and
    selecting between a narrow field of view and a wide field of view by rotating the pairs of powered mirrors and the flat fold mirror about a central axis of the field of view switching mechanism that passes through the flat fold mirror.

10. The method of claim 9, wherein selecting between the narrow field of view and the wide field of view is achieved without changing a size of the exit aperture.

11. The method of claim 10, further comprising providing an afocal telescope configured to form the exit aperture.

12. An optical imaging system having a variable field of view and comprising:
    an active imaging sub-system optically coupled to an exit aperture of the optical imaging system and configured to transmit a beam via the output aperture and to receive a reflection of the beam via the exit aperture;

a passive imaging sub-system optically coupled to the exit aperture and configured to receive electromagnetic radiation via the exit aperture; and a pupil relay having non-unity magnification and configured to switch the field of view of the active imaging sub-system between a wide field of view and a narrow field of view while maintaining a constant size of the exit aperture, the pupil relay being positioned between the exit aperture and the active imaging sub-system and including a pair of Cassegrain telescopes disposed on either side of a flat fold mirror, the pupil relay being further configured to relay the beam between first and second pupils located opposite one another on either side of the pupil relay, and wherein the flat fold mirror and the pair of Cassegrain telescopes are movable about an axis equidistant between the first and second pupils.

13. The optical imaging system of claim 12, further comprising an afocal telescope optically coupled to the active imaging sub-system and to the passive imaging sub-system, and configured to provide the exit aperture.

14. The optical imaging system of claim 12, wherein the active imaging sub-system is a LADAR sub-system, the beam is a laser beam, and the active imaging sub-system includes a laser source configured to emit the laser beam.

15. The optical imaging system of claim 12, wherein the passive imaging sub-system is an infrared imaging system, and the electromagnetic radiation is infrared radiation.

16. The optical imaging system of claim 12, wherein each Cassegrain telescope includes a pair of powered mirrors.

17. The optical imaging system of claim 12, wherein the pupil relay is all-reflective.

18. The optical imaging system of claim 12, wherein the pupil relay has a 3× magnification between the narrow field of view and the wide field of view.

* * * * *